(12) United States Patent
Yen

(10) Patent No.: US 6,904,455 B1
(45) Date of Patent: Jun. 7, 2005

(54) METHOD AND SYSTEM FOR PROVIDING LOCAL CONTENT FOR USE IN PARTIALLY SATISFYING INTERNET DATA REQUESTS FROM REMOTE SERVERS

(76) Inventor: Robert C. Yen, 670 Los Pinos Ave., Milpitas, CA (US) 95035

(*) Notice: Subject to any disclaimer, the term of this patent is extended or adjusted under 35 U.S.C. 154(b) by 706 days.

(21) Appl. No.: 09/721,907

(22) Filed: Nov. 24, 2000

Related U.S. Application Data (60) Provisional application No. 60/210,229, filed on Jun. 6, 2000, provisional application No. 60/188,982, filed on Mar. 13, 2000, and provisional application No. 60/167,516, filed on Nov. 24, 1999.

(51) Int. Cl.[7] .............................................. G06F 13/00
(52) U.S. Cl. ....................... 709/217; 709/203; 709/219
(58) Field of Search ................................ 709/203, 224, 709/200, 201, 216, 217, 218, 219, 227, 229, 232, 233

(56) References Cited

U.S. PATENT DOCUMENTS

| | | |
|---|---|---|
| 5,521,591 A | 5/1996 | Arora et al. |
| 5,701,451 A | 12/1997 | Rogers et al. |
| 5,764,235 A | 6/1998 | Hunt et al. |
| 5,809,242 A | 9/1998 | Shaw et al. |
| 5,870,562 A | 2/1999 | Butman et al. |
| 5,892,825 A * | 4/1999 | Mages et al. .................. 705/51 |
| 5,896,502 A | 4/1999 | Shieh et al. |
| 5,918,013 A | 6/1999 | Mighdoll et al. ........... 709/217 |
| 5,933,600 A | 8/1999 | Shieh et al. |
| 5,944,780 A | 8/1999 | Chase et al. |
| 5,956,716 A | 9/1999 | Kenner et al. |
| 5,961,602 A | 10/1999 | Thompson et al. |
| 5,987,480 A | 11/1999 | Donohue et al. |
| 5,991,809 A | 11/1999 | Kriegsman |
| 5,996,007 A | 11/1999 | Klug et al. |
| 6,003,030 A | 12/1999 | Kenner et al. |
| 6,006,264 A | 12/1999 | Colby et al. |
| 6,014,698 A | 1/2000 | Griffiths |
| 6,014,707 A | 1/2000 | Miller et al. |
| 6,038,601 A * | 3/2000 | Lambert et al. ............. 709/226 |
| 6,108,655 A | 8/2000 | Schleimer et al. ............ 707/10 |
| 6,108,686 A * | 8/2000 | Williams, Jr. ............... 709/202 |
| 6,108,703 A | 8/2000 | Leighton et al. |

(Continued)

FOREIGN PATENT DOCUMENTS

| | | |
|---|---|---|
| WO | WO 01/11488 A2 | 2/2001 |
| WO | WO 01/11502 A2 | 2/2001 |
| WO | WO 01/11503 A2 | 2/2001 |

OTHER PUBLICATIONS

Akamai Technologies, Inc., webpages on Akamai Streaming Overview and Freeflow, http://www.akamai.com, downloaded Feb. 20, 2000.

Cnet features–techno–20 questions: How the Net works, "How does the Net work?" http://coverage.cnet.com/Content/Features/Techno/Networks/ss02.html, downloaded Feb. 19, 2000.

Cnet features–techno–20 questions: How the Net works, "What is the Internet?" http://coverage.cnet.com/Content/Features/Techno/Networks/ss01.html, downloaded Feb. 19, 2000.

"iShopper.com Inc. Acquires Uniq Studios Inc.", Company Press Release, May 16, 2000, http://biz.yahoo.com/bw/000516/ut_ishoppe.html, downloaded Jul. 9, 2000.

*Primary Examiner*—Moustafa M. Meky
(74) *Attorney, Agent, or Firm*—Beyer Weaver & Thomas, LLP (57) ABSTRACT

Improved techniques for data delivery from a server machine to client machines through a network are disclosed. The techniques reduce the demands on connection bandwidth between the client machines and the network, and thus enable media-rich data to be delivered with reduced amounts of network bandwidth. The techniques also reduce the bandwidth demands on network servers and overall network infrastructure.

10 Claims, 6 Drawing Sheets

U.S. PATENT DOCUMENTS

| | | |
|---|---|---|
| 6,112,239 A | 8/2000 | Kenner et al. |
| 6,115,378 A | 9/2000 | Hendel et al. |
| 6,125,209 A | 9/2000 | Dorricott ................... 382/233 |
| 6,166,729 A | 12/2000 | Acosta et al. ............... 345/719 |
| 6,185,598 B1 | 2/2001 | Farber et al. |
| 6,249,787 B1 | 6/2001 | Schleimer et al. ............ 707/10 |
| 6,275,819 B1 * | 8/2001 | Carter ........................... 707/2 |
| 6,557,054 B2 * | 4/2003 | Reisman ...................... 710/33 |
| 6,605,120 B1 | 8/2003 | Fields et al. ................ 715/513 |

* cited by examiner

METHOD AND SYSTEM FOR PROVIDING LOCAL CONTENT FOR USE IN PARTIALLY SATISFYING INTERNET DATA REQUESTS FROM REMOTE SERVERS

CROSS-REFERENCE TO RELATED APPLICATIONS

This application claims the benefit of: (i) U.S. Provisional Patent Application No. 60/167,516, filed Nov. 24, 1999, and entitled "REDUCTION OF DELAY AND BANDWIDTH REQUIREMENTS IN INTERNET DATA TRANSFER," which is hereby incorporated by reference herein; and (ii) U.S. Provisional Patent Application No. 60/188,982, filed Mar. 13, 2000, and entitled "REDUCTION OF DELAY AND BANDWIDTH REQUIREMENTS IN INTERNET DATA TRANSFER," which is hereby incorporated by reference herein; and (iii) U.S. Provisional Patent Application No. 60/210,229, filed Jun. 6, 2000, and entitled "METHOD AND SYSTEM FOR PROVIDING LOCAL CONTENT FOR USE IN PARTIALLY SATISFYING INTERNET DATA REQUESTS FROM REMOTE SERVERS."

This application is also related to U.S. Provisional Patent Application No. 60/221,873, filed Jul. 29, 2000, and entitled "METHOD AND SYSTEM FOR FACILITATING USAGE OF LOCAL CONTENT AT CLIENT MACHINE," and which is hereby incorporated by reference herein.

BACKGROUND OF THE INVENTION

1. Field of the Invention

The present invention relates to networks and, more particularly, to data transmission over networks.

2. Description of the Related Art

The Internet or the World Wide Web is a global network of interconnected computers. Clients or users can access files or documents, e.g., hypermedia documents, residing on host website computers connected to the Internet through a network browser interface program. Examples of network browser interface program include Netscape Navigator or Microsoft Explorer. One type of hypermedia documents is commonly referred to as web pages. Sites (websites) or documents on the Internet are typically chosen by a user by entering a site address, i.e., a URL (uniform resource locator), or by a selection of a link on a displayed web page. The links are typically associated with an HyperText Markup Language (HTML) environment and can be represented by an image, icon, or text label in a web page.

Unfortunately, due to the increased popularity of the Internet and due to the increase in file size of web pages, traffic and congestion on the Internet continue to increase. One reason why web pages being requested are get larger is due the increased use graphic components by websites. It is becoming increasing popular for websites to utilize media-rich web pages. The more media-rich a web page is, the larger its size. Hence, media-rich web pages lead to increased traffic and congestion burdens on various aspects of the Internet and servers coupled thereto. Conventional solutions to these traffic or congestion problems have caused website owners to increase the number of servers they operate and have caused website owners to lease additional bandwidth for coupling their servers to the Internet, both of which are expensive solutions.

The increases in the file sizes of web pages also burdens the clients (users) of client machines attempting to obtain web pages from servers over the Internet. Given that client machines couple to the Internet over bandwidth-limited links, clients face increasing delays. Typically, the bandwidth-limited links are provided by an Internet Service Provider (ISP). Examples of the links include plain old telephone (POT) line, ISDN line, DSL line, or cable line. While some links support more bandwidth, the additional bandwidth comes at a cost to the clients. Regardless, of the link, as the size of web pages get larger, the longer it takes to download the files to the client machine. Hence, as files (e.g., web pages) become larger (e.g., more media rich), the longer they take to be downloaded to the client machines. While media-rich web pages offer great ability to hold users' interest, download delays frustrate users and can cause loss of traffic to websites.

Therefore, there is a need for improved techniques for efficiently and economically delivering web pages to client machines.

SUMMARY OF THE INVENTION

Broadly speaking, the invention relates to improved techniques for data delivery from a server machine to client machines through a network. The techniques reduce the demands on connection bandwidth between the client machines and the network, and thus enable media-rich data to be delivered with reduced amounts of network bandwidth. The techniques also reduce the bandwidth demands on network servers and overall network infrastructure.

According to one aspect, the invention relates to techniques for efficient delivery of data to local client machines. The invention provides efficient data delivery by subsidizing remotely available content from remote servers on the network with locally available content. The locally available content can be provided to the local client-machines on portable storage media. According the amount of data delivered over the network from the remote servers to the local client machines is reduced to the extent of the availability of the locally available content. The invention is particularly well suited for the delivery of data over the Internet such as from remote servers (web servers) to local client machines.

According to another aspect, the invention also relates to techniques for distributing data (locally available content) to local clients for use with local client machines. The locally available content is distributed to the local clients on portable computer readable data storage media. These techniques allow for the improved promotion of goods or services of business entities though rapid availability of images, namely, high resolution graphic images. The invention is particularly well suited for Internet enabled local computers when accessing websites associated with the business entities.

The invention can be implemented in numerous ways, including as a computer system, an apparatus, and a method. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for data delivery from a server machine to client machines through a network. The techniques reduce the demands on connection bandwidth between the client machines and the network, and thus enable media-rich data to be delivered with reduced amounts of network bandwidth. The techniques also reduce the bandwidth demands on network servers and overall network infrastructure.

According to one aspect, the invention relates to techniques for efficient delivery of data to local client machines. The invention provides efficient data delivery by subsidizing remotely available content from remote servers on the network with locally available content. The locally available content can be provided to the local client machines on portable storage media. According the amount of data delivered over the network from the remote servers to the local client machines is reduced to the extent of the availability of the locally available content. The invention is particularly well suited for the delivery of data over the Internet such as from remote servers (web servers) to local client machines.

According to another aspect, the invention also relates to techniques for distributing data (locally available content) to local clients for use with local client machines. The locally available content is distributed to the local clients on portable computer readable data storage media. These techniques allow for the improved promotion of goods or services of business entities though rapid availability of images, namely, high resolution graphic images. The invention is particularly well suited for Internet enabled local computers when accessing websites associated with the business entities.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
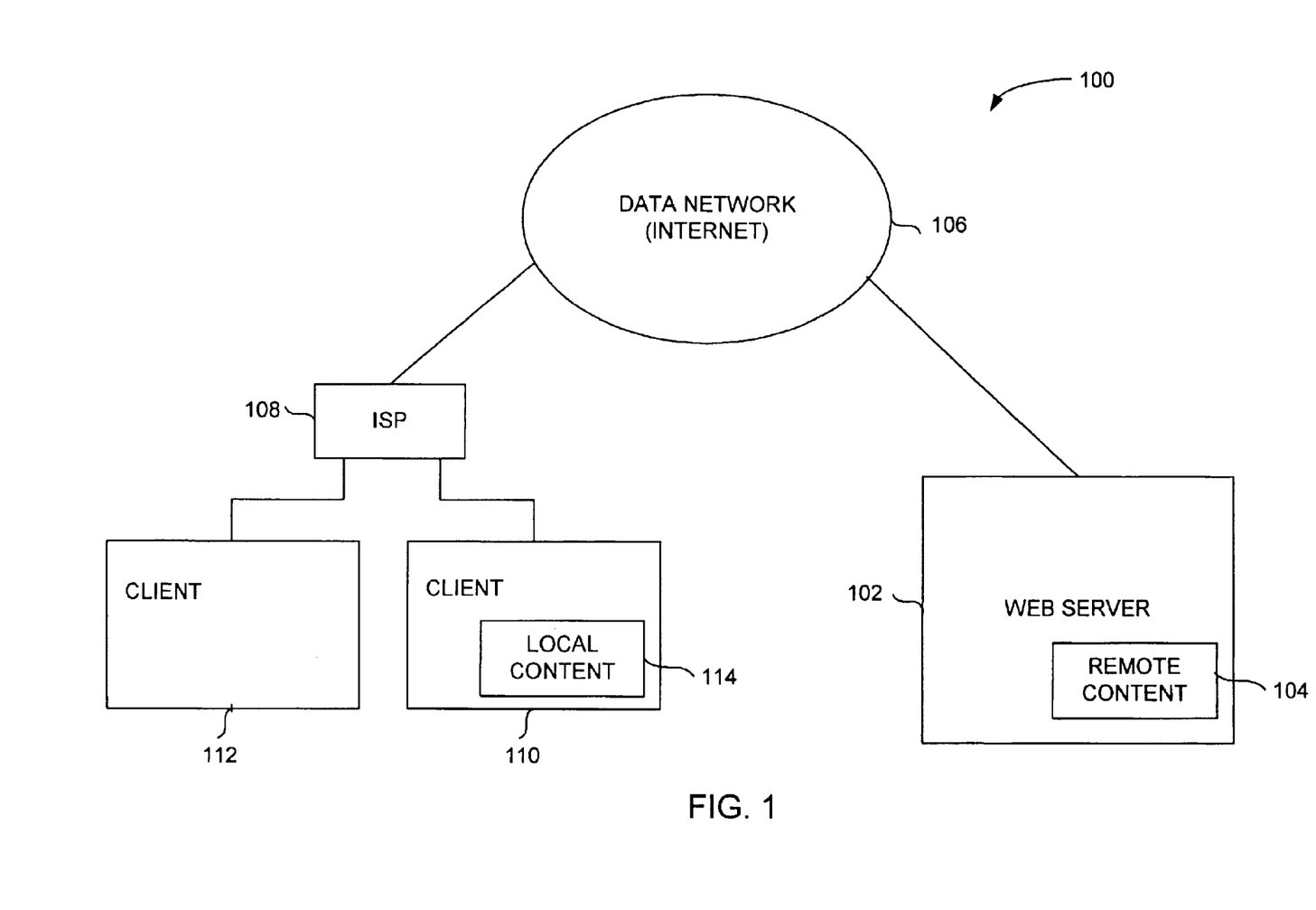
FIG. 1 is a block diagram of a distributed content delivery system according to one embodiment of the invention.

FIG. 1 is a block diagram of a distributed content delivery system 100 according to one embodiment of the invention. The distributed content delivery system 100 includes a web server 102 that controls access to remote content 104. The web server 102 couples to a data network 106. In one embodiment, the data network 106 includes the Internet. Typically, the web server 102 couples to the data network 106 over a high speed connection, such as over a leased line (e.g., a T1 or T4 line). An Internet Service Provider (ISP) 108 also couples to the data network 106. Typically, the ISP 108 couples to the data network over a high speed connection, such as over a leased line. The ISP 108 services a plurality of clients, such as client 110 and client 112. The client 110 is shown as having local content 114 available for use, whereas the client 112 is assumed not to have any such local content available.

The distributed content delivery system 100 operates to reduce the data transmission load through the data network 106. More particularly, during operation of the client 110 and the web server 102, the local content 114 is utilized to reduce the amount of data (e.g., remote content 104) that is transmitted from the web server 102 to the client 110 through the data network 106. Not only is the data transmission load reduced on the web server 102 and the data network 106, but also for the ISP 108 and its connections with the data network 106 and the client 110.

Figure 2:
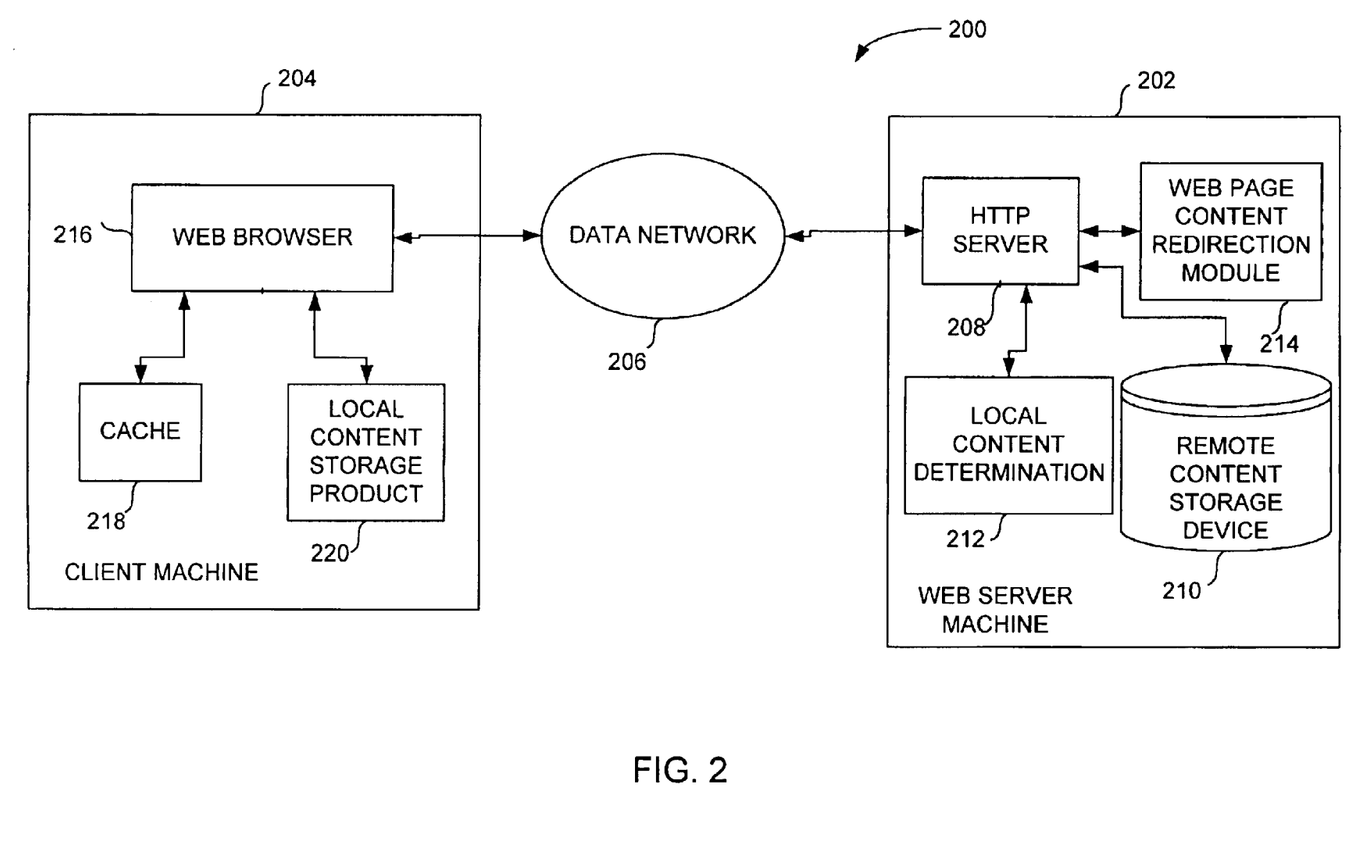
FIG. 2 is a block diagram of a distributed content delivery system according to one embodiment of the invention.

FIG. 2 is a block diagram of a distributed content delivery system 200 according to one embodiment of the invention. The distributed content delivery system 200 includes a web server machine 202 and a client machine 204. The web server machine 202 and the client machine 204 are interconnected through a data network 206. In one embodiment, the data network 206 includes the Internet.

The web server machine 202 includes a HTTP server 208. The HTTP server 208 controls the web server machine 202 in both receiving a request for content as well as for responding to the request with the delivery of data. The HTTP server 208 couples to a remote content storage device 210 to obtain remote content stored therein. The HTTP server 208 also couples to a local content determination module 212 and a web page content redirection module 214. Typically, when a request for data is received at the HTTP server 208, certain remote content is accessed and thereby retrieved from the remote content storage device 210 and then sent back through the data network 206 as a response to the requesting client machine.

According to the invention, the HTTP server 208 can make use of the local content determination module 212 and the web page content redirection module 214 to reduce the amount of remote content that needs to be transmitted from the web server machine 202 to the client machine 204. In this regard, the local content determination module 212 can examine the incoming request, or data (e.g., codes) associated therewith, to determine whether the requesting client machine has local content that can be used to supplant (be used in place of) some of the remote content. When the local content determination module 212 determines that suitable local content is available at the requesting client machine, then the HTTP server 208 can interact with the web page content redirection module 214 to modify, construct or select the response to the client machine 204 so as to reduce the amount of remote data to be sent and to redirect the requesting client machine to access pertinent portions of the local content to supplement the remotely supplied content.

The client machine 204 includes a web browser 216, a cache 218, and a local content storage product 220. The web browser 216 is a network browser such as Microsoft Internet Explorer or Netscape Navigator. The cache 218 is used by the web browser 216 to store previously requested remote content that has been received at the client machine 204. Typically, the web browser 216 stores such previously obtained requested data in the cache 218 on a disk drive associated with the client machine 204. The local content storage product 220 is typically a portable computer readable medium such as a CD-ROM, floppy disk, data storage card, or any other portable or semi-portable computer readable medium.

In the web server machine 202, the web page content redirection module 214 is able to dynamically modify or produce a reduced size response by referring to local content in place of supplying remote content. The web page content redirection module 214 can also predetermine reduced size responses. For example, web pages stored in the remote content storage device 210 can be processed to produce reduced size versions that refer to local content. When predetermined, the reduced size responses can also be stored in the remote content storage device 210. Also, when predetermined, the web page content redirection module 214 need only select the reduced size response (instead of a full size response). Still further, the determination of the reduced size versions can be done by a different computer other than the web server machine 202.

Figure 3:
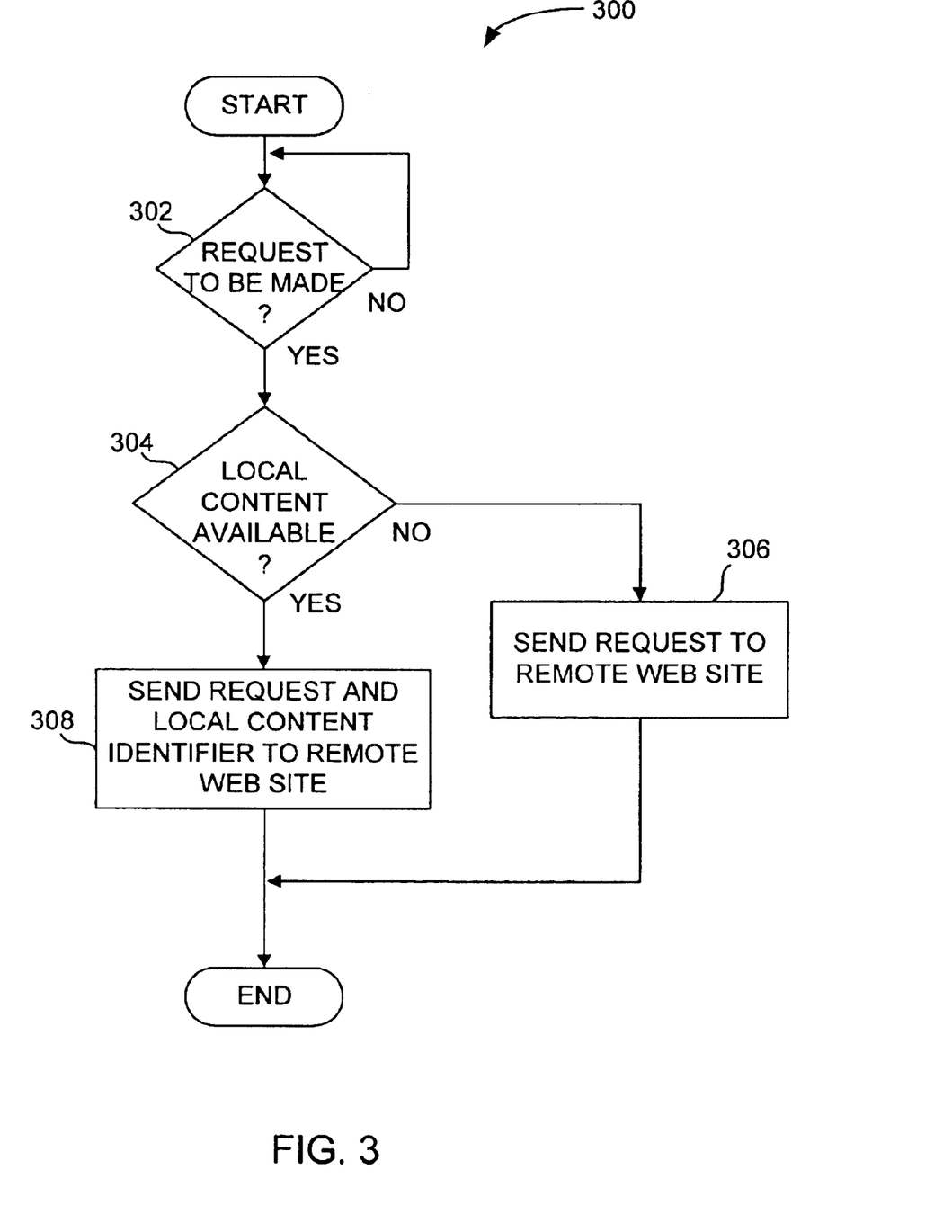
FIG. 3 is a flow diagram of client-side request processing according to one embodiment of the invention.

FIG. 3 is a flow diagram of client-side request processing 300 according to one embodiment of the invention. The client-side request processing 300 is, for example, performed by the client machine 204 illustrated in FIG. 2 or the client machine 110 illustrated in FIG. 1.

The client-side request processing 300 begins with a decision 302 that determines whether a request is to be made. When the decision 302 determines that a request does not need to be made, the client-side request processing 300 awaits the need for a request. Once the decision 302 determines that a request is to be made, a decision 304 determines whether local content is available. When the decision 304 determines that local content is not available, then a request is sent 306 to the remote web site (e.g., the web server machine 202). Alternatively, when a decision 304 determines that local content is available, then a request together with a local content identifier are sent 308 to the remote web site. Typically, a request operates to request a web page from the remote web site. The local content identifier can identify the local content available at the client machine. For example, the local content can be provided by the local content storage product 220 of the client machine 204 illustrated in FIG. 2. Following the operations 306 and 308, the client-side request processing 300 is complete and ends.

Figure 4:
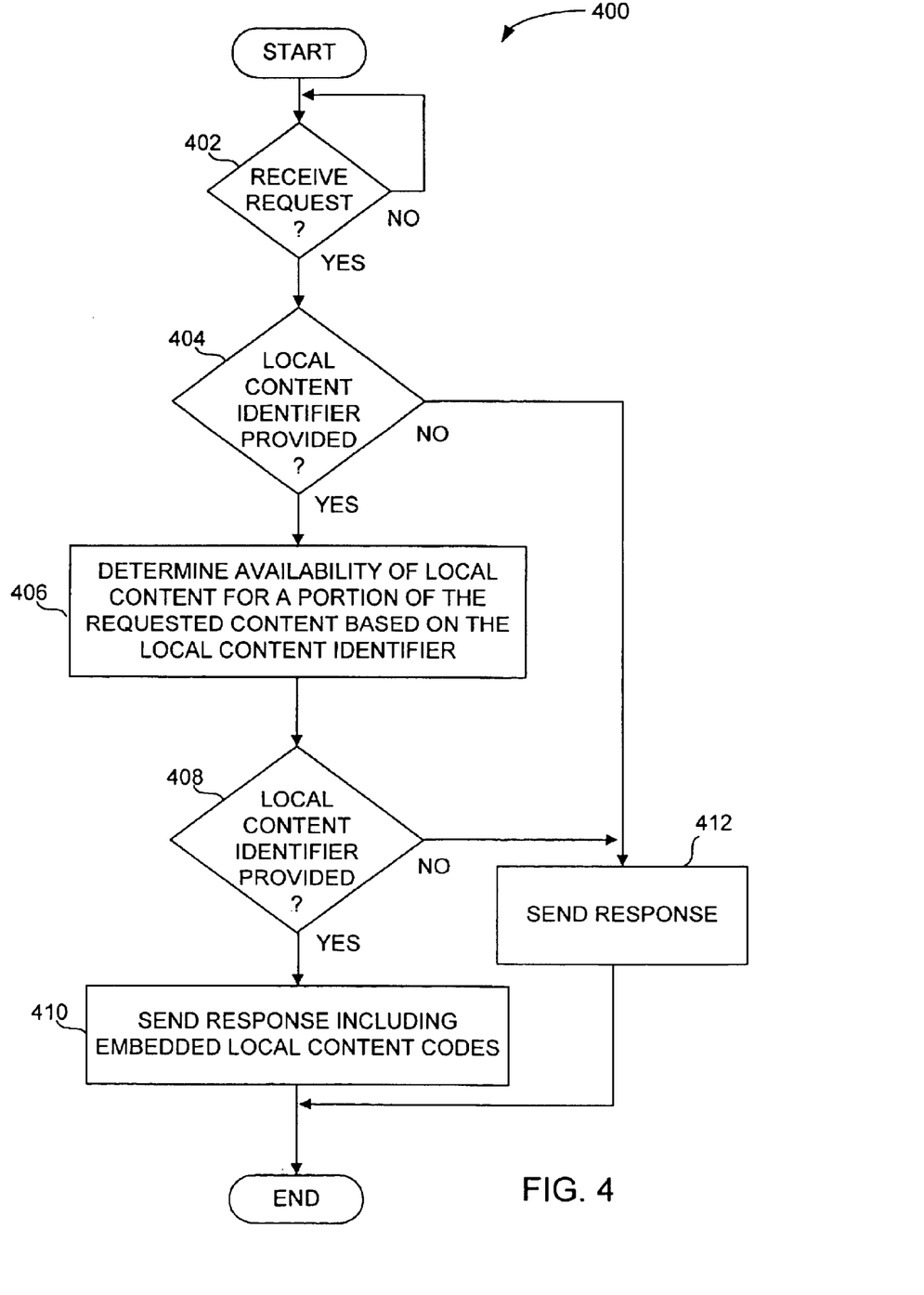
FIG. 4 is a flow diagram of server-side response processing according to one embodiment of the invention.

FIG. 4 is a flow diagram of server-side response processing 400 according to one embodiment of the invention. The server-side response processing 400 is, for example, performed by the web server machine 202 illustrated in FIG. 2 of the web server 102 illustrated in FIG. 1.

The server-side response processing 400 begins with a decision 402 that determines whether a request has been received. When the decision 402 determines that a request has not been received, then the server-side response processing 400 awaits the receipt of a request. Once the decision 402 determines that a request has been received, the decision 404 determines whether a local content identifier has been provided. Typically, the local content identifier can be provided within the request or be associated with the request. In other embodiments, the local content identifier can be separately requested from the client machine.

When the decision 404 determines that a local content identifier has been provided, the availability of local content is determined 406 based on the local content identifier. Next, a decision 408 determines whether the needed local content for at least a portion of the requested content is available. When the decision 408 determines that the needed local content is available, then a response is sent 410 (e.g., from the web server machine 202) including local content codes. In one embodiment, the local content codes are embedded in the response. When the local content codes are included in the response, the response has a reduced size because certain remote content that is locally available content is not part of the response and is instead replaced by the local content codes. Alternatively, when the decision 404 determines that no local content identifier has been provided or when the decision 408 determines that the needed local content is not available, then the response is sent 412 without reference to any local content. Following operations 410 and 412, the server-side response processing 400 is complete and ends.

Figure 5:
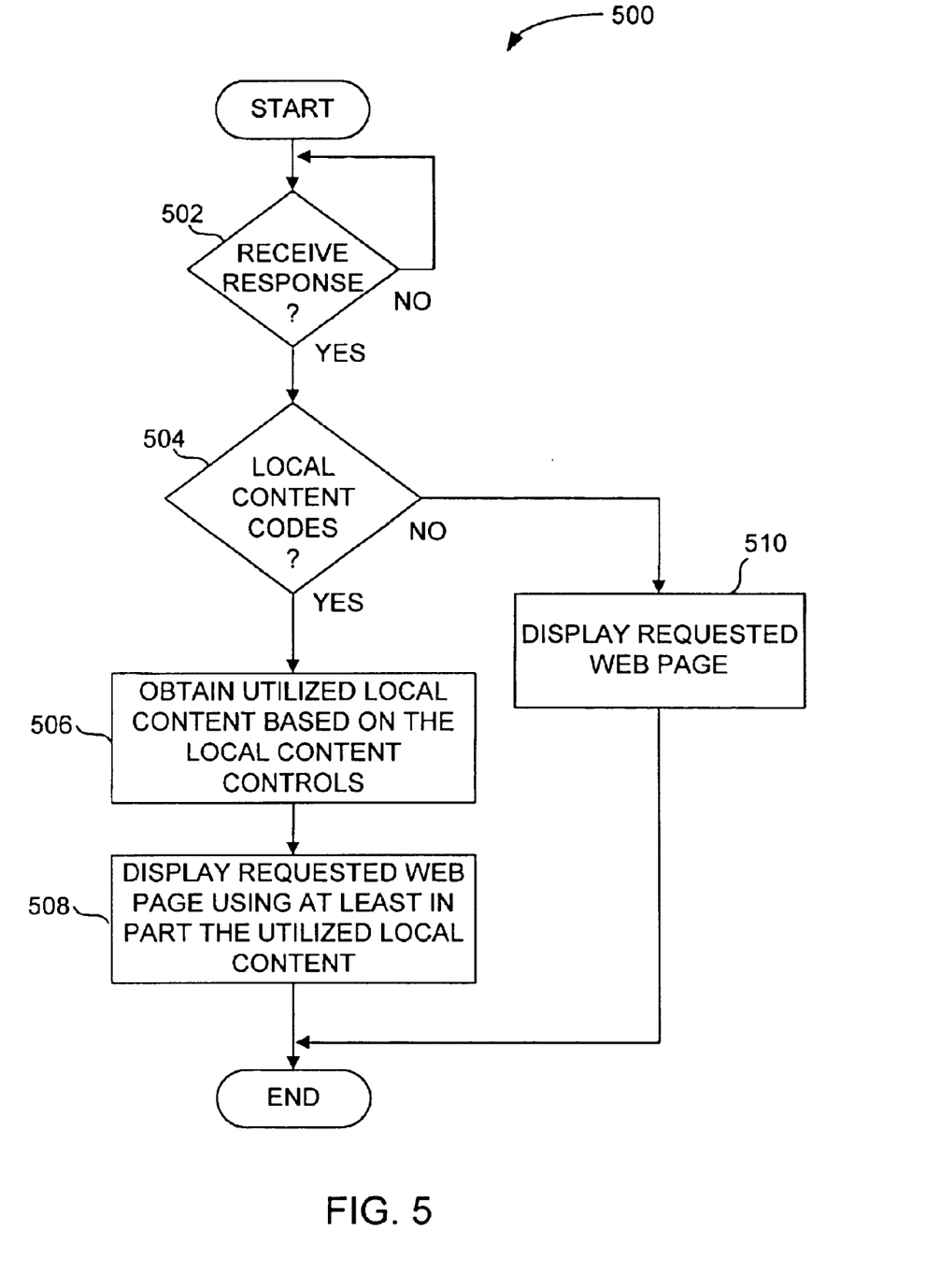
FIG. 5 is a flow diagram of client-side response processing according to one embodiment of the invention.

FIG. 5 is a flow diagram of client-side response processing 500 according to one embodiment of the invention. The client-side response processing 500 is, for example, performed by the client machine 204 illustrated in FIG. 2.

The client-side response processing 500 begins with a decision 502 that determines whether a response has been received. When the decision 502 determines that a response has not yet been received, the client-side response processing 500 awaits such a response. Once the decision 502 determines that a response has been received, a decision 504 determines whether local content codes are provided with the response. In one embodiment, the local content codes are embedded in the response. When the decision 504 determines that local content codes are provided with the response, then the utilized local content is obtained 506 based on the local content controls. Here, the local content being utilized with the response, namely, the local content portion of the response, is obtained 506 from the local content storage product, such as the local content storage product 220 of the client machine 204 illustrated in FIG. 2. In other words, the local content is provided by a portable data storage product.

Next, the requested web page (resource) is displayed 508 using at least in part the utilized local content. The web page being displayed is thus the result of remote content obtained from the remote web site (web server) as well as the local content obtained locally such as from the local content storage product associated with the client machine. Following the display of the requested web page, the client-side response processing 500 is complete and ends. Alternatively, when the decision 504 determines that the response does not include local content codes, then instead of operations 506 and 508, the client-side response processing simply displays 510 of the requested web page provided by the remote web server. Following the operation 510, the client-side response processing 500 is complete and ends.

Accordingly, the invention facilitates the providing users with high resolution graphic images without requiring long user waiting periods for image downloads and without needing to consume large amounts of precious network bandwidth. Hence, users receive high resolution images with fast response times. The high resolution images can be used for many purposes. Some examples of uses for the high resolution images can pertain to advertisements, products, and services. As a particular example, the invention facilitates a website providing an online merchandise catalog having high resolution images that are rapidly retrievable.

Figure 6:
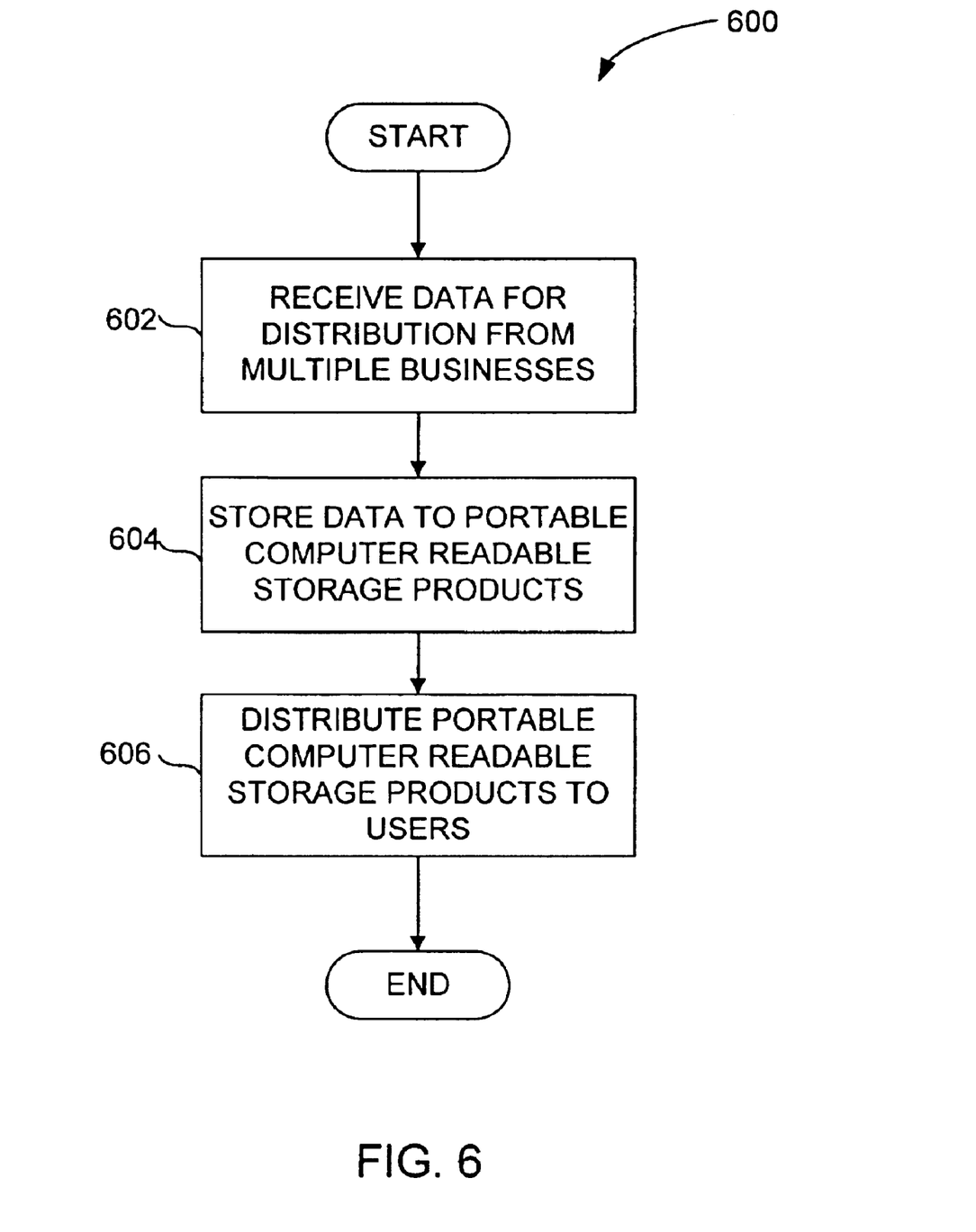
FIG. 6 is a flow diagram of a distribution method for portable computer readable storage products.

FIG. 6 is a flow diagram of a distribution method 600 for portable computer readable storage products. The distribution method 600 receives 602 data for distribution from multiple businesses. The data is stored 604 to portable computer readable storage products. In one embodiment, the data includes images or graphics. Images or graphics are commonly used with websites to provide a more interesting or productive user interface. As examples, the images or graphics can pertain to advertising, products, buttons, icons, logos, videos, animations, and the like. Since images or graphics tend to have relatively file sizes (as compared to text), providing images or graphics on portable readable storage products which are locally available can provide significant improvements in responsiveness in accessing (viewing) websites from a browser. After the data is stored 604 to the portable computer readable storage products, the portable computer readable storage products are distributed 606 to users.

The portable computer readable storage products can be distributed to uses in a variety of ways. For example, the portable computer readable storage products can be mailed to users. As another example, the portable computer readable storage products can be made available at various locations (e.g., food or retail stores). Still another example is the distribution of the portable computer readable storage products with newspaper delivery. With respect to providing content for advertisements, the portable computer readable storage products can contain basic advertisement components. A manufacturer's image for a product can be used by multiple retailers or distributors. Hence, this enables inefficiencies that would occur in redundant images were used for each of the retailers and distributors.

Thereafter, the users can place the portable computer readable storage product into a data reader of their internet-enabled computing device. For example, the data reader can be associated with a storage medium drive (e.g., card slot controller, CD drive, or floppy drive). Then, when the user requests website content, a portion of the website content that is available locally is obtained from the portable computer readable storage product via the data reader instead of over the network.

Since the data (content) on the portable computer readable storage product may become stale or out-dated at some point, the portable computer readable storage products are preferable periodically updated and then re-distributed to the users. The one or more local content identifiers can inform web servers whether the available local content is current (i.e., not stale).

Incentives can be provided to encourage users to retrieve or use the portable computer readable storage products. The types of incentives can vary widely and might, for example, include performance improvement (e.g., fast downloads), money, sweepstakes, prices, frequent flyer miles, coupons, rebates, etc.

In one embodiment, remote websites are able to control the use of data from clients' local computer readable storage product(s). When local content is available and used by remote websites, such remote websites realize financial benefits by savings on channel bandwidth requirements which are reduced and realize improvements in data transfer speed due to less Internet traffic congestion. The clients realize the benefit of a more reliable data transfer and a much shorter average wait for a medium to large size data transfer. The invention can also improve system reliability of remote web sites during the peak use period due to the reduction in data traffic at its own server system and routers.

The data (e.g., images) stored on the portable computer readable product can be compressed. Hence, with compression, the portable computer readable product can store more data. For example, a 1 Gigabyte CD can store 100,000 images compressed to 10,000 bytes.

The images stored on the portable computer readable product can be assigned special codes to be used with host websites and web browsers. Generally available merchandise can thus be viewed on a large number of websites and thus all such websites can use the appropriate special codes to access the common images for use as a portion of a web page. In other words, standard codes can assigned to products (e.g., common merchandise) so many websites can use images common images. This facilitates manufacturers and sellers in updating their images at a central location.

The host websites that utilize the local content to reduce their bandwidth demands can be charged based on the bytes of data accessed from the portable computer readable storage product. The rate can be significantly less than what host sites will otherwise pay for bandwidth costs. In one embodiment, there would be no charge for re-viewing a web page when the content is retrieved from its cache memory. The host websites can alternatively be charged at a portion of the transaction costs. In one embodiment, the client machine can send information to a transaction monitoring server to notify the transaction monitoring server about the data that has been accessed from the portable computer readable storage product and for what host website, thereby facilitating charging host website based on bytes of data accesses.

Still further another aspect of the invention is that when the portable computer readable storage product is being accessed, a small image (e.g., icon) can be displayed on the web page including the data (content) being retrieved from the portable computer readable storage product. The small image serves to providing branding for the website enhancements provided through use of the portable computer readable storage products.

The invention is also advantageous when data centers or mirror sites are used by host websites. The invention greatly reduces the amount of data that needs to be retrieved from data center. The response time for retrieving such data can be more relaxed due to smaller amount of data within a certain amount of time. Therefore, the speed and capacity requirements for such storage units at the data center is greatly reduced. At the same time, the amount of data needed to be transmitted to the client users through internet is reduced.

The advantages of the invention are numerous. Different embodiments or implementations may yield one or more of the following advantages. One advantage of the invention is that bandwidth is more efficiently utilized. Another advantage of the invention is that local data is made available at client machines (e.g., by way of a portable computer readable storage media) to reduce that amount of data that needs to be transferred over a network. Still another advantage of the invention is that network congestion and traffic as well as server loads are reduced. Yet another advantage of the invention is that the inventive techniques are cost effective and facilitate use of media-rich websites for promotion and sale of good and services. In some cases, the invention can also allow users to get better graphic quality than might be available from the remote host website.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for satisfying a request from a user for content from a web server, said method comprising:

(a) receiving a request for remote content from the web server to be delivered to a local machine over a data network, the local machine being associated with the user; and (b) preparing a response to the request, at least a first portion of the response including remote content and at least a second portion of the response including at least one local content code, the local content code identifying certain local content available at the local machine that is to form part of the response.

2. A method as recited in claim 1, wherein said method further comprises:

(c) sending the response to the local machine over the data network.

3. A method as recited in claim 1, wherein said preparing (b) comprises:

(b1) determining availability of local content at the local machine;

(b2) acquiring the remote content for the first portion of the response from the web server;

(b3) determining the local content code appropriate for the second portion of the response; and (b4) forming the response from the remote content for the first portion and the local content code appropriate for the second portion.

4. A method as recited in claim 1, wherein the data network comprises the Internet.

5. A method for satisfying a request for content from a web server, said method comprising:

(a) receiving, at the web server, a request for remote content to be delivered to a local machine over a data network, the request being initiated by a user of the local machine;

(b) determining availability of local content at the local machine;

(c) preparing a response to the request, the response including at least remote content from the web server and a local content code, the local content code identifies certain local content to be used with the response.

6. A method as recited in claim 5, wherein the local content is provided at the local machine on a removable, portable data storage medium.

7. A method for reducing size of web pages provided by web servers, said method comprising:

(a) receiving a request for a web page at a web server from a client machine, the request being initiated by a user of the client machine;

(b) determining whether the client machine has a portable storage medium of local content; and (c) transmitting the web page from the web server to the client device, the web page having a reduced size when said determining (b) determines that the client machine has the portable storage medium of the local content.

8. A method as recited in claim 7, wherein the web page has the reduced size because the web page includes at least one code for selecting certain of the local content from the portable storage medium and thus not transmitting such content from the web server.

9. A method as recited in claim 7, wherein said determining (b) comprises:

receiving an identification code for the portable storage medium, and determining whether the portable storage medium contains usable local content for the web page based on the identification code.

10. A method as recited in claim 9, wherein the identification code comprises one or more of a series, version or data code.

* * * * *